Dec. 11, 1956 H. GÜNTHER 2,773,969
DEVICE FOR PRODUCING AUXILIARY MAGNETIC FIELDS
IN ELECTRIC ARC WELDING
Filed March 9, 1954 3 Sheets-Sheet 1
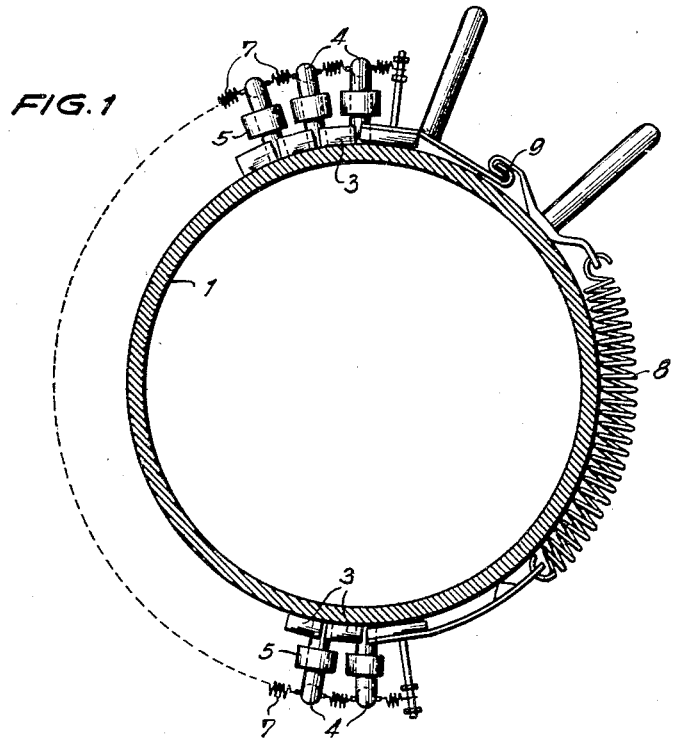
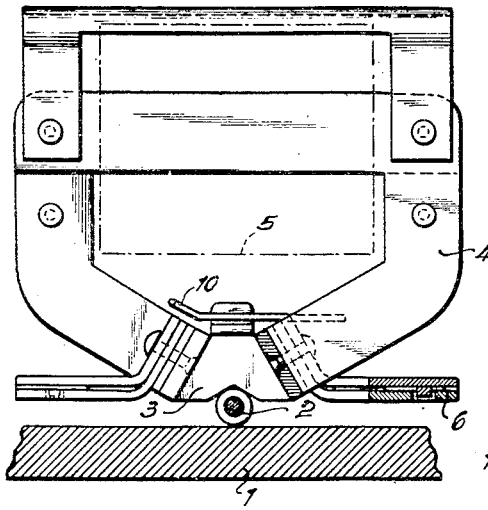
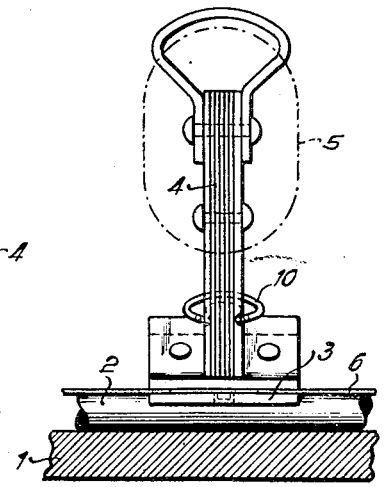
INVENTOR
Hans Günther
by Armand E. Mertens
Attorney

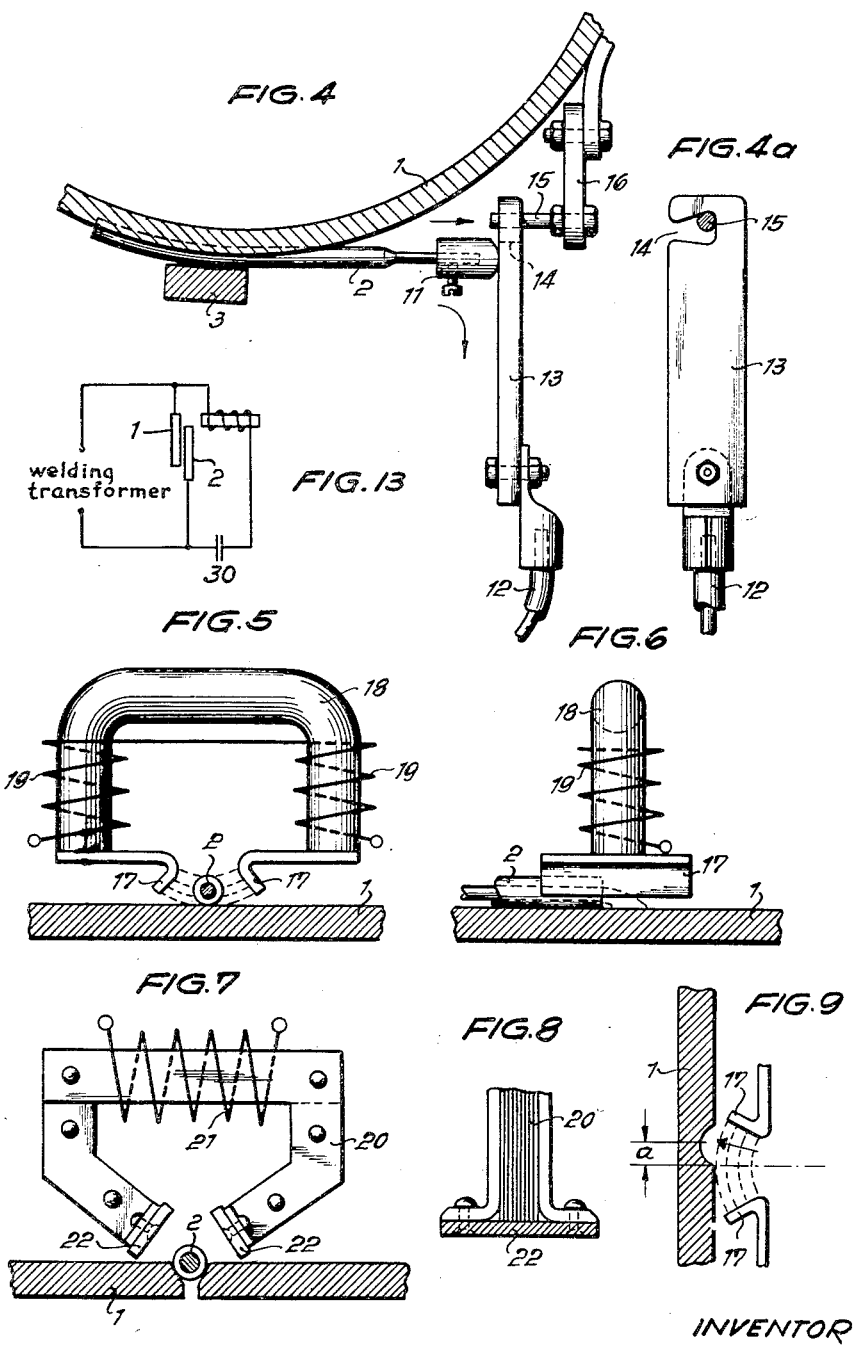

United States Patent Office 2,773,969
Patented Dec. 11, 1956

2,773,969

DEVICE FOR PRODUCING AUXILIARY MAGNETIC FIELDS IN ELECTRIC ARC WELDING

Hans Günther, Mosbach, Baden, Germany, assignor to Kraftanlagen A. G., Heidelberg, Germany Application March 9, 1954, Serial No. 415,094

Claims priority, application Germany March 14, 1953

27 Claims. (Cl. 219—130)

The invention relates to a device for electric arc welding with heavily coated electrodes laid longitudinally between or on the rims of the joint and with the use of auxiliary magnetic fields serving to control the position of the arc in such manner that a really satisfactory weld is obtained in all practical welding positions (angles of inclination) of the seam to be welded, i. e. not only in the "standard" or horizontal position, for welding from above, but also in any "special" position, e. g., vertical and overhead, or any inclination of the seam between 0° and 180° from the horizontal. This applies to a very wide variety of welding operations, for example the making of butt welded connections in open seams, i. e. producing the "root fill" without any backing, as well as the subsequent overlayers, built-up welding and the like, and to all thicknesses of walk of the abutting parts in any of these instances.

By means of the device according to the invention, such auixiliary magnetic fields can be applied in precisely determinate fashion and proportioned in accordance with the particular conditions involved. The device is characterized in that the system of magnets serving to produce the auxiliary field or fields, and a holder of non-magnetizable material to hold the electrode against the work, are combined into one assembly to be set firmly upon the joint.

In the case of arc welding of joints in curved surfaces, for example the welding of circular seams in pipes not free to rotate, the device is subdivided along the seam into a plurality of narrow segments transverse to the seam and interconnected by flexible parts, so that the seam to be welded is covered throughout its length by a girdle of concatenated holding means and systems of magnets, adaptable with pressure to the curved surface of the work. Thus such a "magnetic girdle" is of especial value in the laying of pipelines, since the pipe cannot be rotated in place. The same applies to welding on stationary tanks.

It is known that in the said special welding positions, the action of gravity on the fused material interferes with production of a uniform and sufficiently broad welding bead. For this reason, the use of machine methods has hitherto been confined to welding in standard position, i. e. to cases in which the joint is horizontal and can be welded from above. However, even in this simplest standard case, if the end of the electrode makes an angle other than 90° with the plane of the work, none of the known processes can produce a weld in an open joint without an auxiliary magnetic field, because in the case of ferrous materials, the strong natural magnetic field would draw the base of the arc towards the upper edges of the V and thereby prevent adequate root fill (complete filling of the bottom of the joint with molten material from the electrode, and simultaneous fusion of the two bottom edges of the joint). This applies, for example, to "insertion" methods where an electrode is laid into the joint to be welded.

Finally, even welding machines with arc perpendicular to the surface of the work can make the root weld only in "trough" position, i. e. with the use of backing strips, since satisfactory penetration of the weld to the two bottom edges of the joint, in known processes, requires a large volume of molten material, which must be held, until it solidifies, by the backing strip, usually of copper and frequently provided with a groove, to serve as a mold.

All of these difficulties and disadvantages are eliminated by the device according to the invention, by means of which the position of the base of the arc on the work can be continuously and automatically controlled so that the undesirable effects described are consistently counteracted to the extent required in order to produce a satisfactory weld. This is true in all cases where an inserted or applied electrode is employed. Among the various techniques of this kind, particular mention may be made of those using coated electrodes, as well as of the submerged arc welding processes, in which a plain electrode is imbedded in welding powder.

The chief field of application of the device according to the invention is the arc welding of circular seams in stationary pipes using coated electrodes, as e. g. in laying pipelines, which has hitherto required to be done manually by exceptionally expert welders. Because of the outstanding value of the invention in this particular special case, the idea of the invention will be further described, and is represented in the accompanying drawing, in terms of an embodiment for this specific purpose, together with the component elements of a magnetic girdle as aforesaid, in which drawing, Fig. 1 is a section through a circular joint in a pipe, with applied magnetic girdle according to the invention.

Figs. 2 and 3 represent an individual element of the said girdle.

Fig. 4 shows the current-supply means, while Fig. 4a represents an element of the said means in side view.

Figs. 5 to 8 are simplified representations of magnet systems, for reference in further description of magnetic conditions in particular.

Fig. 9 represents a variant for a particular case.

Fig. 13 illustrates a device for arc welding with a capacitor for phase adjustment.

Figure 10:
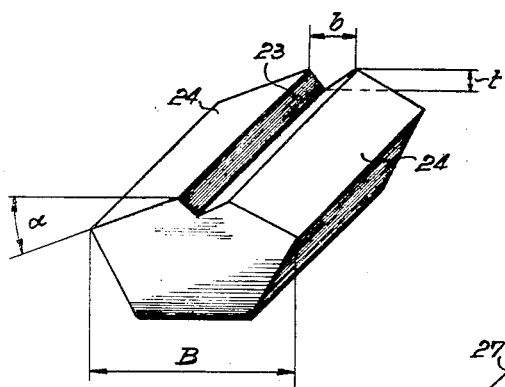
Figs. 10 to 12 show embodiments of the holding and pressing means, of non-magnetic material.

The magnetic girdle in Figs. 1 to 3 is shown in position for use to produce a circular weld in a pipe 1. It serves to produce an auxiliary field in transverse direction to the seam, for the purpose of deflecting the arc towards the work 1. The coated electrode 2 is applied to the part 1 and is held firmly in position against the same by means of the pressure block 3. The auxiliary field is produced by means of horseshoe magnets 4 actuated by means of coils 5.

As Fig. 1 shows in simplified representation, the device is composed of a plurality of individual pressure blocks with magnets 4, to permit adaptation to the curved surface of the pipe. The individual elements are here interconnected by means of clamped steel bands 6. Other flexible means may of course be used instead. At their upper ends, the several elements are interconnected by springs 7 which serve to keep them from tilting.

The two ends of the resulting close-fitting girdle are joined by a strong tension-spring 8 and a conveniently engageable and disengageable catch 9, provided with handles.

The form and arrangement of the magnetic poles depends on the required properties of the auxiliary fields in a given case. The magnet shown in Figs. 2 and 3 serves to generate an auxiliary field passing substantially above the surface of the work.

The pressure block 3, inserted in the space between the two poles, is spring-clamped in a pincer-like loop 10 so that it can readily be replaced when worn.

In welding circular seams in pipes or tanks of large diameter, it is desirable to weld the seam in successive segments, for example to make the circular seam in two semicircular welds, with each layer overlapping slightly at the two junctions. In pipes and tanks of very large dimensions, subdivision into a larger number of segments may be called for.

By means of the magnetic girdle according to the invention, it is possible to obtain different magnetic field strengths at various points along the weld, thus taking account of local variations in welding conditions. Thus, in the first place, the welding conditions vary with the inclination of the joint, which varies continually from point to point in a circular seam not in a horizontal plane. In the second place, welding conditions, in the case of multiple welds, depend on whether the root fill or the first or a subsequent overlay is being made. Adaptation of the auxiliary fields produced to these various requirements can readily be accomplished by dissimilar choice of the coils 5, which are advantageously in series, while the elements themselves, i. e. the magnets 4, pressure blocks 3 etc., can be made all alike.

Current is supplied by the means represented in Fig. 4, to the stripped end of the electrode 2, on which a highly conductive cap 11 is mounted. The face of the latter strikes a contact piece 13 which yields under applied force and is connected to the supply cable 12. The set-screw shown in the drawing is superfluous if the hole in the cap 11 and the stripped end of the electrode are suitably tapered, so that the latter can be firmly wedged in, thus reducing contact resistance. The cap 11 should preferably be of copper to conduct heat away from the point of contact and dissipate it by radiation from the large area of the cap. The contact piece 13, preferably also of copper, has a lateral cut-out 14 engaging a pin 15 above the point of contact, as seen in side view in Fig. 4a. This pin 15 is attached to the pipe 1 by way of an insulating part 16. As the free end of the electrode 2 expands under heating, the cap 11 thrusts the copper strip 13 along, overcoming friction between pin 15 and strip 13, thus maintaining contact pressure.

When the welding operation has been completed, so that the electrode 2 has been used up through the last element 3 holding it, the remnant of the electrode, under the weight of the heavy cap 11, will drop about a center of rotation near 3, as indicated by a declining arrow, while the copper strip 13 will remain in its last position. This current supply arrangement therefore effects an automatic cut-off of the welding current. In order positively to prevent possible adhesion of the cap 11 to the contact piece 13, the cap and if necessary also the contact area on the part 13 may be provided with a coating to prevent contact welding, for example a coating of silver or silver graphite.

With the aid of the simplified representations in Figs. 5 to 8, the magnetic conditions involved will now be described in more specific detail. For simplification, the part 1 has here been drawn as a continuous piece, since the discussion will apply to all of the various possible cases, as to the case of welding in an open gap (root fill), one or more cover fills to be applied thereto, and built-up welding, the purpose of which is to build up welds on the surface of a solid part.

It has previously been mentioned that the embodiment of a magnetic girdle in the present example serves to generate an auxiliary field whose lines of force pass substantially above the work, namely in the region of the arc, perpendicular to the direction of the seam and substantially parallel to the surface of the work. This "external field" must be of such polarity that the arc is deflected towards the work.

In known devices with auxiliary fields for controlling the arc, the lines of force, in the great majority of cases, pass through the work, so that in cover fills, there remains only a comparatively weak dispersion field to control the arc. Consequently, such known devices require high total field strengths to keep the dispersion field sufficiently strong. This uneconomical practice is unnecessary in the case of the magnetic girdle according to the invention. The poles 17, disposed on either side of the electrode 2 at a comparatively short distance from each other, and generally not in contact with the work, generate a magnetic field of force whose more pertinent portion is indicated in Fig. 5. Of course, there are also lines of force passing through the part 1, but this component of the total flux is not so great as in the aforesaid known devices. Nevertheless, in the case of an open joint (Fig. 7), the flux passing through the two edges of the work and through the gap is sufficient to ensure establishment of a sound root fill. If, after closure of the gap by the said root fill, additional layers are to be applied, the magnetic flux through the arc above the work is sufficient to control the arc in the desired direction. The inclination of the faces of the two poles to the surface of the work may be between about 45° and 90°, and preferably about 60°.

In the magnet system of Figs. 5 and 6, the magnet 18, bearing two coils 19, is a solid round bar, while in the magnet system of Figs. 7 and 8, the magnet 20 is composed of transformer plates and has a single winding 21 on the yoke. The two outermost transformer plates are somewhat thicker and longer, and flanged at the ends. These flanged ends are fitted with pole plates 22.

An external field of the sort described affords a number of potential advantages. Since its action is based on lines of force independent of the work, it can be used in welding non-ferrous metals. It is also especially useful in cases where the surface of the work near the seam departs from the horizontal in transverse direction. Thus in Fig. 9, the extreme case of welding a horizontal seam in a vertical wall is illustrated. Since the arc always tends to follow the fused material, it will burn asymmetrically; in the use of known methods, the weld droops against the lower edge of the seam in such cases. This undesirable effect can be mitigated, or practically eliminated, by placing the magnetic poles producing the external field asymmetrically, as shown in Fig. 9. This asymmetry with respect to the centerline of the joint should be such that the external magnetic force controlling the arc contains not only a component deflecting it towards the work, but also a component directed upward. In other words, the resultant force due to the external field should be directed substantially as indicated by the arrow in Fig. 9. To accomplish this, it is sufficient to shift the poles downward by a distance $a$ from the joint. Other means, not explicitly illustrated, for producing an external field with asymmetrical action consist in placing the magnet system in oblique position, so that the more elevated pole is at a greater distance from the surface of the work 1 than the less elevated pole. It is thus possible by either means— or by combination of both—to counteract the said undesired effects by selecting the kind and degree of asymmetry.

It should be mentioned in this connection that the device according to the invention is suitable for direct-current and alternating-current welding alike. However, in using alternating current, account must be taken of its inherent properties, in particular phase displacement and core losses in the magnet and the work. Thus the phase displacement, due to the inductance of the auxiliary field circuit, between the impressed auxiliary field voltage and the current or field vector, causes a corresponding reduction of the active component of the auxiliary field vector, acting in opposite phase to the arc voltage.

Owing to the smallness of the inductance of the arc circuit compared to the active power, the phase displacement between arc voltage and arc current is very small, and is therefore practically negligible in its effects. Hence it is only necessary to take account of the phase displacement of the current generating the auxiliary field relative to the welding voltage or current.

If the auxiliary field is generated by the welding current itself (series connection), then, for proper polarity, the auxiliary field will always be exactly in opposite phase to the arc field. But if the auxiliary field circuit is in parallel with the welding circuit, then, owing to its resulting considerably greater inductance, the auxiliary field will always have a certain lagging phase displacement with respect to the arc voltage. In many cases, this phase displacement is not sufficiently great to produce any undesirable effects. In any event, however, the inductive phase displacement may readily be wholly or partially compensated in otherwise known manner by means of condensers 30 connected in series, as shown in Fig. 13. It may even be overcompensated, thus advancing the auxiliary field relative to the phase of the arc, under which condition the arc will be especially stable.

Figure 12:
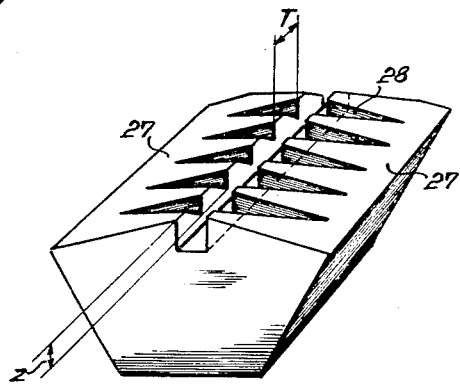
Figure 11:
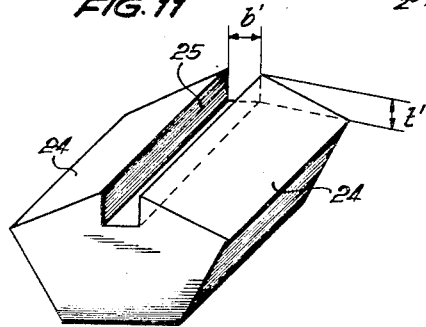

Figs. 10 to 12 show three embodiments of the pressure block, simplified to the extent that only the surface pertinent to the welding operation, and serving to guide the flow of slag, will here be discussed in detail, the features relating to its retention by means of the clip 10 being apparent from the preceding Fig. 2.

In this pressure block of non-magnetizable material, serving to press the electrode against the work, the face is preferably provided with a longitudinal groove, so that the pressure block will simultaneously serve to center the magnetic girdle upon the electrode, i. e. to hold it in an accurately determined position and secure it against lateral displacement.

In welding with laid on or inserted electrodes, especially in vertical or overhead positions, the effect of gravity on the flux and molten material causes difficulty. Especially in the case of welding electrodes with thick coatings and correspondingly large quantity of flux and slag produced, the production of a satisfactory weld may thereby be hindered if not rendered impossible. The invention discloses a method of controlling flow and freezing rate of slag by mechanical means, this being done by such conformation of the face of the pressure block that the surface layer of the fused slag in contact with the said face is caused to adhere to the latter and that ample room is provided on either side of the travelling arc. The result of this is that the fused slag can be spread out substantially laterally over the face asymmetrically on either side of the centerline of the joint, and is thus prevented from running down an inclined seam. This effect is due to the fact that the adhesive area between the flux and the flux-supporting face of the pressure block is considerably increased, the surface tension of the flux bed is rendered more effective and the freezing time is reduced.

For the practical embodiment of this idea, two possible solutions suggest themselves. One consists in rendering the face of the pressure block highly adhesive with respect to the slag. This may advantageously be done by making the entire pressure block of such highly adhesive material. The other possible solution consists in such conformation of the face so that gravity flow is prevented and the slag diverted laterally with the aid of additional design features.

The pressure block in Fig. 10 represents a simple embodiment adequate in many cases when made of a material exerting sufficiently strong adhesion upon the fused slag. Such materials, for example, include certain kinds of ceramics. The centering groove 23 has the simple cross-sectional form of an obtuse angle. The width of the groove may advantageously be of the order of $b=0.6$ to 0.8 D, where D is the outside diameter of the electrode coating. The optimum depth is then of the order of approx. $t=0.15$ to 0.20 D. The optimum inclination of the laterally adjacent surfaces 24 to induce lateral flow of the slag is about $\alpha=10°$. The total width of the pressure block may be of the order of B=3D to 4D.

When the pressure block is made of a material less effectively wetted by the fused slag, and consequently exerting less adhesive effect on the latter, as e. g. hard coal or graphite, an embodiment as in Fig. 11 may be used. This more favorable shape is likewise suitable for slags of lower viscosity. Here the electrode centering groove 25 is considerably deeper and of rectangular cross-section. The width of this groove is preferably about $b'=0.6$ to 0.8 D as before, while the depth may best be $t'=0.4$ to 0.6 D. The fused slag will then completely fill the cross section of the groove at any inclination of the seam, thus supporting the fused slag and keeping it from running out.

The embodiment of Fig. 12 is still more highly effective and hence suitable for still less favorable conditions. Thus this shape may be used when the pressure block is made of material having still less adhesiveness, and when the electrodes used form a slag of exceptionally low viscosity. The essential feature of this pressure block is that the inclined surfaces 27 on either side of the groove 26 are provided with notch-like serrations 28 of depth $z=0.2$ D measured at the edge of the groove. The spacing of the resulting notches is about $T=0.6$ to 1.2 D. The groove 26 is here shown with rectangular cross-section as in Fig. 11. However, the notch-like serrations 28 may also be applied to the embodiment according to Fig. 10, with triangular groove.

As regards choice of suitable materials for making the pressure blocks, this is readily determined by trial on the principles outlined. A ceramic compound with addition of graphite has proved especially suitable. In such a material, the carbon content prevents any reaction with the fused slag, such as may cause difficulty in the case of pure ceramics. Consequently, the slag, after cooling of such a guide block made of ceramic containing carbon, can readily be removed without defacing or injuring the weaker ceramic surface.

Summarizing, then, the magnetic girdle according to the invention permits electric arc welding with applied or inserted electrodes at any inclination of the seam and even in an open gap without backing, by simple and reliable means. The girdle is easily attached to and removed from the work. Supply of welding current is simple and reliable. The welding current is automatically cut off at exactly the right point when the welding operation is completed. Spatial position of the weld and of the seam is no obstacle. In automatic arc welding methods and devices hitherto known, the continual variation of conditions due to gravity along a curved weld in a stationary part (change of inclination in space) result in irregular condition of the finished weld. To prevent this, it has therefore been necessary to revolve the part continuously during welding in order to keep the arce in proper "welding position." But in all cases where rotation of the part is not possible, known automatic arc welding methods and devices have therefore been inapplicable, and manual welding has been indispensable in order to obtain reasonably satisfactory welds. On the contrary, by use of the device according to the invention, it is possible without difficulty to take account of such varying conditions in advance, and to produce a perfectly uniform weld even on non-rotatable parts, with the aid of a moderate amount of equipment.

While the idea of the invention has been represented and described largely in terms of particular embodiments that have been found to represent particularly advantageous practical applications, the invention is nevertheless not limited to such particular embodiments. Specifically, the several elements described may optionally be employed in any combination with each other.

What I claim is:

1. In a device for arc-welding where a coated welding electrode is arranged substantially parallel to the welding joint and in contact therewith, at least one pressure block of non-magnetizable material, said pressure block being adapted to be positioned transversely across the electrode and spaced from the work on both sides of the electrode, whereby an open gap is formed on each side of the electrode between the work and the pressure block, at least one means for generating a magnetic field, said magnetic field extending transverse to the electrode and in a direction to deflect the arc and the molten material towards the work, and positioning means, said positioning means forcing said pressure block towards the electrode, whereby the electrode is positioned with respect to the work.

2. In a device as claimed in claim 1, in which at least one of said pressure blocks forms a structural unit with at least one of said means for generating a magnetic field, said positioning means holding said unit against the work.

3. In a device as claimed in claim 1 for arc-welding of closed-loop joints, a plurality of said pressure blocks, on equal plurality of said magnetic means, each pressure block forming a structural unit with one adjacent magnetic means, said units being arranged adjacent one another along the joint and each covering a comparatively short section of the joint, said positioning means comprising a plurality of flexible members interconnecting each pair of adjacent structural units, whereby a closed-loop structure of concatenated pressure blocks and magnetic means, surrounding the closed-loop joint with a required pressure, is formed.

4. In a device as claimed in claim 1 for arc-welding of closed-loop joints, a plurality of said pressure blocks, an equal plurality of said magnetic means, each pressure block forming a structural unit with one adjacent magnetic means, said units being arranged adjacent one another along the joint and each covering a comparatively short section of the joint, said positioning means comprising a plurality of flexible members interconnecting each pair of adjacent structural units except one, a tension spring, a closure connected to said tension spring, said tension spring-closure assembly connecting the excepted pair of said structural units, whereby a structure of concatenated pressure blocks and magnetic systems is formed which can be readily engaged and disengaged from the work.

5. In a device for arc-welding as claimed in claim 1, a plurality of means for generating a magnetic field, said magnetic means generating different strength magnetic fields adapted to meet the different welding requirements along the joint.

6. In a device as claimed in claim 1, in which at least one of said magnetic means has a substantially U-shaped cross-section, each leg of the U representing one magnetic pole, and at least one of said pressure blocks is replaceably arranged between the two poles of said magnetic means.

7. In a device as claimed in claim 6, in which said replaceable arrangement for said pressure block comprises a substantially U-shaped spring, said spring clamping onto said magnetic means, and said pressure block having a groove for engagement with said spring.

8. In a device as claimed in claim 1, in which said pressure block has a centrally located groove adapted to fit onto the electrode, the depth of the groove being shallow compared to the electrode diameter, whereby open channels are formed on both sides of the electrode between said pressure block and the work.

9. In a device as claimed in claim 1, a conducting cap, said cap fitting onto the metallic end of the electrode, a contact piece, said cap being braced against said contact piece, said contact piece being adapted to yield to the pressure of the electrode, expanding when heated, while maintaining adequate contact with said cap, and a current supply connected to said contact piece.

10. In a device as claimed in claim 9, in which at least one of the mutually contacting areas of said cap and of said contact piece are covered with a coating of adhesion-preventing material.

11. In a device as claimed in claim 9, said cap being of sufficient weight to pull the electrode end downwards.

12. In a device as claimed in claim 9, in which said contact piece is mounted slidably under friction.

13. In a device as claimed in claim 12, a horizontal guide pin, said guide pin being rigidly connected to the work, and said contact piece having a cut-out adapted to slidably engage said guide pin under friction.

14. In a device as claimed in claim 1, in which at least one of said means for generating a magnetic field generates a field substantially parallel to the surface of the work, the main portion of the field being located above and close to the work.

15. In a device as claimed in claim 14, in which at least one of said means for generating a magnetic field comprises two magnetic poles of opposite polarity having pole faces, each of said pole faces being located on one side of and tilted with respect to a central plane through the joint and at right angles to the work, the tilt being such that the portions of the pole faces further away from the work are closer to the central plane than the portions of the same pole faces closer to the work.

16. In a device as claimed in claim 1 when it is desirable to cause a deflection in a direction deviating from the direction at right angles to the surface of the work, in which at least one of said means for generating a magnetic field generates a field having a component at right angles to the surface of the work and a component in the surface of the work at right angles to the electrode, whereby a deflection towards the work in an asymmetrical manner with respect to the joint is obtained.

17. In a device as claimed in claim 16, in which said means for generating a magnetic field comprises two poles of opposing polarity, said poles being arranged asymmetrically with respect to a central plane through the joint and at right angles to the work.

18. In a device as claimed in claim 17 for welding joints when the surface of the work has a vertical component at an angle to the joint, said poles being shifted with respect to the central plane in a downward direction, whereby the higher pole is closer to the joint than the lower pole.

19. In a device as claimed in claim 1 for A. C. welding, in which at least one of said means for generating magnetic fields is an electromagnet, said electromagnet being connected in parallel with the arc, a capacitor for adjusting the relative phase of the welding current and the current generating the magnetic field.

20. In a device as claimed in claim 8, in which the pressure block towards the work and electrode is of such material composition and conformation that the fused slag surface in contact with it will adhere, whereby the fused slag spreads laterally on the said surface, symmetrically with respect to the centerline of the joint, and is prevented from running down an inclined seam.

21. In a device as claimed in claim 20, in which said pressure block is of a material that is highly adhesive with respect to the fused slag.

22. In a device as claimed in claim 21, in which said pressure block is of a material selected from the group consisting of hard coal, graphite, ceramic material, and ceramic material with carbon added.

23. In a device as claimed in claim 20, in which said pressure block has a groove for centering it upon a coated electrode, said groove having an obtuse angle in cross-section, the width of the groove being about 0.6 D to 0.8 D, the depth about 0.15 to 0.20 D, D designating the outside diameter of the electrode coating and the inclination of the portions of the surface adjacent to the edge of the groove about $\alpha = 10°$.

24. In a device as claimed in claim 20, in which said pressure block has a groove for centering it upon a coated electrode, said groove being rectangular in cross section, the width of the groove being about 0.6 to 0.8 D, the depth 0.4 to 0.6 D, D standing for outside diameter of electrode coating and the inclinattion of the portions of the surface adjacent to the edge of the groove about α=10°.

25. In a device as claimed in claim 23, in which said face of the pressure block is provided with notch-like serrations extending laterally from and substantially perpendicular to the groove.

26. In a device as claimed in claim 24, in which said face of the pressure block is provided with notch-like serrations extending laterally from and substantially perpendicular to the groove.

27. In a device as claimed in claim 25, in which said notch-like serrations have a depth of about 0.2 D in the vicinity of the edges of the groove, and the spacing of the notches is about 0.6 to 1.2 D, D standing for outside diameter of electrode coating and the inclination of the portions of the surface adjacent to the edge of the groove about α=10°.

References Cited in the file of this patent

UNITED STATES PATENTS

| | | |
|---|---|---|
| 1,512,786 | Morton | Oct. 21, 1924 |
| 1,580,020 | Cutler et al. | Apr. 6, 1926 |
| 1,854,536 | Wilson | Apr. 19, 1932 |
| 1,972,029 | Norquist | Aug. 28, 1934 |
| 1,987,691 | Lincoln | Jan. 15, 1935 |
| 2,220,576 | MacKusick | Nov. 5, 1940 |
| 2,269,369 | Hafergut | Jan. 6, 1942 |
| 2,347,914 | Kricker | May 2, 1944 |
| 2,430,266 | Zimmerman | Nov. 4, 1947 |